(12) United States Patent
Conner, Jr.

(10) Patent No.: US 12,479,353 B2
(45) Date of Patent: Nov. 25, 2025

(54) SELF LOCKING CHAIN AND FREIGHT BINDER

(71) Applicant: Robert L. Conner, Jr., Mountain Home, AR (US)

(72) Inventor: Robert L. Conner, Jr., Mountain Home, AR (US)

( * ) Notice: Subject to any disclaimer, the term of this patent is extended or adjusted under 35 U.S.C. 154(b) by 577 days.

(21) Appl. No.: 17/885,957

(22) Filed: Aug. 11, 2022

(65) Prior Publication Data

US 2023/0049274 A1 Feb. 16, 2023

Related U.S. Application Data

(60) Provisional application No. 63/233,536, filed on Aug. 16, 2021.

(51) Int. Cl.
*B60P 7/08* (2006.01)
*F16G 11/12* (2006.01)

(52) U.S. Cl.
CPC ............. *B60P 7/083* (2013.01); *F16G 11/12* (2013.01)

(58) Field of Classification Search
CPC .......... B60P 7/083; F16G 11/12; F16G 15/08
USPC ....................................................... 410/100
See application file for complete search history.

(56) References Cited

U.S. PATENT DOCUMENTS

| | | |
|---|---|---|
| 2,824,717 A | 2/1958 | Yeager |
| 2,867,406 A | 1/1959 | Davis |
| 3,049,328 A | 8/1962 | Bishop |
| 3,218,031 A | 11/1965 | Lucas |
| 3,418,006 A | 12/1968 | Durbin |
| 3,954,252 A * | 5/1976 | Lyons ..................... F16G 15/00 24/270 |
| 3,974,668 A | 8/1976 | McWhorter |
| 4,238,940 A | 12/1980 | McWhorter |
| 4,711,106 A * | 12/1987 | Johnson .................. E05B 67/36 70/34 |
| 5,544,718 A * | 8/1996 | Schumacher ............. E06C 7/14 182/141 |
| 6,139,235 A * | 10/2000 | Vander Koy ......... B60P 7/0807 410/101 |
| 6,572,060 B2 * | 6/2003 | Yoon ........................ E06C 1/20 248/167 |
| 6,575,000 B1 * | 6/2003 | Li ........................... E05B 67/36 280/507 |

(Continued)

*Primary Examiner* — Joseph M Rocca
*Assistant Examiner* — Jose Antonio Martinez
(74) *Attorney, Agent, or Firm* — Stephen D. Carver

(57) ABSTRACT

A rigid locking binder for mechanically securing large, heavy loads and tie-down chains used for securing loads. The variable length binder comprises a rigid, threaded rod coaxially coupled within an elongated sleeve, such that relative axial displacements of the rod relative to the sleeve or vice-versa results in lengthwise expansion or contraction. The binder has chain hooks at opposite ends, that are pivotally associated with remote ends of the rod and sleeve for coupling to loads or anchor points. An assembly for selectively locking the sleeve and rod together establishing a selected binder length comprises a rigid lever pivotally mounted to the sleeve that controls a thread locking mechanism. The lever is pivoted between parallel pin plates secured to the sleeve. The thread locking mechanism comprises a threaded half nut that selectively engages or disengages rod thread portions that are exposed through an access window defined in the sleeve.

1 Claim, 4 Drawing Sheets

(56) References Cited

U.S. PATENT DOCUMENTS

| | | | |
|---|---|---|---|
| 6,951,346 B2 * | 10/2005 | Brackett | B60D 1/075 |
| | | | 280/491.2 |
| 7,065,840 B2 * | 6/2006 | Profit | B60P 7/0838 |
| | | | 24/71 TD |
| 7,399,148 B2 * | 7/2008 | Bruun | B63B 25/24 |
| | | | 410/85 |
| 8,118,525 B2 * | 2/2012 | Long | B60P 7/15 |
| | | | 410/151 |
| 8,418,525 B2 | 4/2013 | Long | |
| 9,610,883 B1 | 4/2017 | Mahaffery | |
| 2004/0140602 A1 * | 7/2004 | Gerritsen | B25B 5/068 |
| | | | 269/6 |
| 2005/0191118 A1 * | 9/2005 | Kay | F16G 11/12 |
| | | | 403/48 |
| 2020/0164786 A1 | 5/2020 | Ruan | |

* cited by examiner

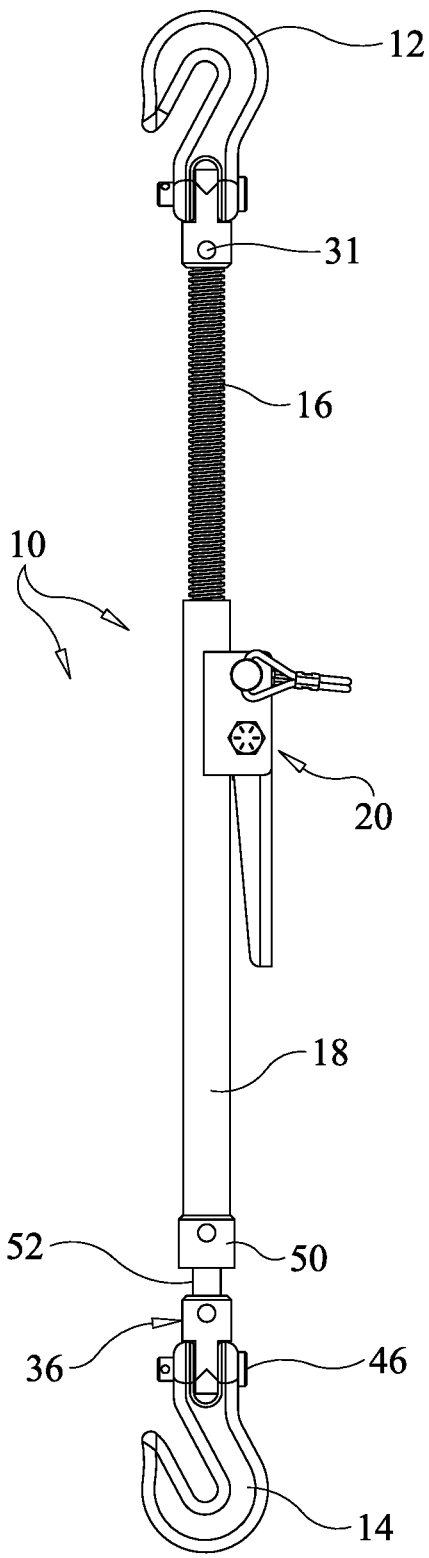
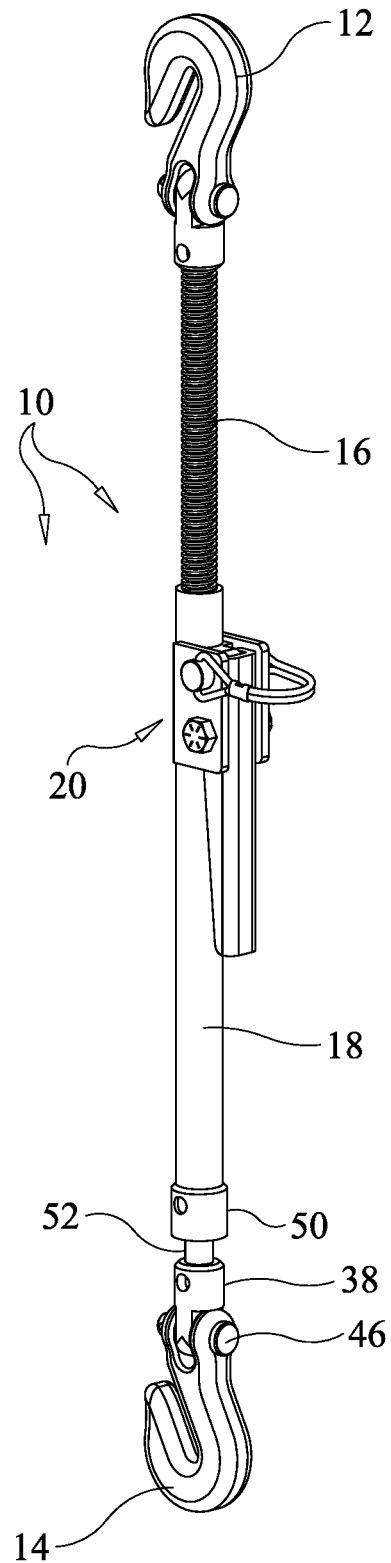
FIG. 1
FIG. 2

SELF LOCKING CHAIN AND FREIGHT BINDER

CROSS-REFERENCE TO RELATED APPLICATION

This application is based upon prior U.S. Provisional Patent Application, Ser. No. 63/233,536, filed Aug. 16, 2021, and entitled "Self Locking Chain and Freight Binder," by inventor Robert L. Conner, Jr., an American Citizen residing in Mountain Home, Ark., and said pending Provisional Application is hereby incorporated by reference.

BACKGROUND OF THE INVENTION

I. Field of the Invention

This invention relates generally to tie-down systems for securing freight involving heavy loads. More particularly, the invention relates to tie-down binders for reinforcing the conventional chain arrangements that tie-downs use, for example, with flatbed trailers hauling large loads in interstate commerce. Prior art involving such binders can be found in USPC class 52, subclass 632, and in CPC classes B6OP and B61D.

II. Description of the Prior Art

It is axiomatic that during the transportation of heavy loads of goods and miscellaneous freight, the shipped items need to be securely bundled so that they cannot escape from the vehicle or trailer. Usually tie-down chains are used. A load binder is an apparatus for tensioning a chain, cable, strap or similar apparatus to reinforce the load tie-down means. A variety of elongated, metal load binders or tie-downs are commonly deployed for tensioning and securing heavy loads on flatbed trucks, ships at sea, railroads and the like. Tie-downs are also used with large aircraft for securing freight. Tie-downs include chains, cables, straps, ropes or other tensioners. Large flatbed trucks or "eighteen wheelers" are commonly observed transporting heavy and/or irregular cargoes including diverse products or devices, logs, pipes, rods, various containers and the like. Typically load binders may be used directly to secure loads to the carrier during transport, or they may be used as ancillary tighteners to tension the main cargo chains or straps. Load binders may be installed and tensioned after installation of the usual hold-down chains to brace the load and stabilize the freight for safe transport.

The prior art includes a wide variety of binder designs. Load binders, commonly used by transporters, may include threadably coupled, axially aligned elements that may be rotated for tightening or loosening the unit. Some common binders comprise lever action actuators or turnbuckles. Levers incorporated into different handle designs may be secured with various locking mechanisms. There are various types of ratchet chain binders. The screw type chain binder changes a distance between the hooks at both ends of the ratchet chain by revolving the component threads to axially draw pieces together so that hooks at each end of the binder tighten the load. Some binders are tensioned by pivoted handles, some use threadably coupled axial elements, some use various drive gears, and many binders use an overcenter action.

For example, U.S. Pat. No. 2,824,717 issued Feb. 25, 1958 discloses an elongated binder that can be tensioned both with threadably engaged axial portions, and with a handle that moves overcenter to provide locking tension. Initial tensioning of the device occurs in response to handle pivoting.

Other prior art references employing pivoted parts that establish an overcenter action include U.S. Pat. No. 2,867,406 issued Jan. 6, 1959, U.S. Pat. No. 3,218,031 issued Nov. 16, 1965, U.S. Pat. No. 3,418,006 issued Dec. 24, 1968, U.S. Pat. No. 3,954,252 issued May 4, 1976, U.S. Pat. No. 3,974,668 issued Aug. 17, 1976, U.S. Pat. No. 4,238,940 issued Dec. 16, 1980, show similar tie-downs with overcenter actions.

U.S. Pat. No. 3,049,328 issued Aug. 14, 1962 shows an interesting binder that can constrain and tension various products and the chains used on flat-bed trailers. It includes an elongated rack coextensive with the unit's length that can be engaged by a handle-controlled gear portion to axially lock the device, once deployed at a selected length.

U.S. Pat. No. 9,610,883 issued Apr. 4, 2017 shows a binder comprising a gear box containing a bevel gear assembly which can be driven by a socket wrench for tensioning. Threaded shafts move in and out of the barrel based on the rotation of the gear. The tensioning device uses direct gearing. Rotational motion of the drive gear rotates the barrel, causing the shafts to be linearly displaced, thereby tightening or loosening a chain, cable or strap.

United States Patent Publication 20200164786 published May 28, 2020 discloses a ratchet chain binder comprising a rotating shaft, a ratchet, a handle for driving the ratchet, and bevel drive gears. The rotating shaft is provided with a transmission gear and a transmission bevel gear simultaneously engaging the two drive bevel gears.

With normal flatbed trucks there are dozens of tightening or hold-down chains deployed to secure the load. During a long interstate haul, one or more tie-down chains may inadvertently loosen over time in response to shock and vibrations. Loads braced by conventional tie-down chains may be further strengthened by the use of separate binders or "cinch tools." Depending upon the size and quantity of the cargo items, a large number of chains and binders may be necessary. Obviously to prepare a heavyweight load for interstate transportation the binders needed can be numerous. And of course, the time involved in properly installing and adjusting the chains and binders can be significant, even becoming prohibitive.

It is thus critical to provide a binder that can be deployed reliably and quickly. Furthermore, such a binder must be equipped with a highly reliable locking means so whatever it is attached to remains secure and stable. Appropriately-designed, and properly installed and tensioned binders or cinch tools must absolutely and reliably secure conventional cargo chains and cargo loads, so that potentially catastrophic loosening and failure during freight transport is avoided.

SUMMARY OF THE INVENTION

This invention comprises a binder or cinch tool for locking loads and chains to secure loads transported by flatbed trucks.

Elongated telescoped portions can be axially displaced to quickly make gross adjustments in length, and to tighten the apparatus. An elongated, threaded rod portion is coaxially received within an elongated sleeve. An external lever or handle portion displaces a thread-engaging insert that can be brought into contact with the device's threaded rod to lock the binder. An access window is defined in the sleeve structure to permit access to and exposure of exposed rod threads.

Thus an object of the invention is to provide a secure and reliable binder for securing loads, tie-down chains and the like.

A basic object is to provide a reliable, heavy duty cinch tool or binder for securing large, bulky loads of the type that are often transported by eighteen-wheeler flatbed trucks.

Thus a broad object is to promote highway safety.

A related object is to provide a reliable binder that quickly locks or unlocks. It is a feature of the invention that the threaded rod portion is telescopically, coaxially received within an unthreaded, hollow sleeve so the two can be axially displaced quite quickly to allow the binder to assume a predetermined length prior to locking.

A related object is to provide a binder of the character described that readily and quickly permits and facilitates gross length adjustments.

Another object is to provide a binder of the character described that is safe and dependable.

A further object is to provide a binder of the character described that can reliably tension various loads involving both large and small items of diverse shapes and sizes and weights of the types encountered with over-the-road heavy trucks.

It is also an object to provide a binder or cinch tool that is extremely fail-safe. It is a feature of my invention that unlocking is prevented with a thread lock element.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is an isometric view of my new Self Locking Chain and Freight Binder;

FIG. 2 is an isometric view of my new binder, showing it rotated approximately forty-five degrees about its longitudinal axis from the position of FIG. 1;

DETAILED DESCRIPTION OF THE VARIOUS VIEWS OF THE DRAWINGS

Figure 3:
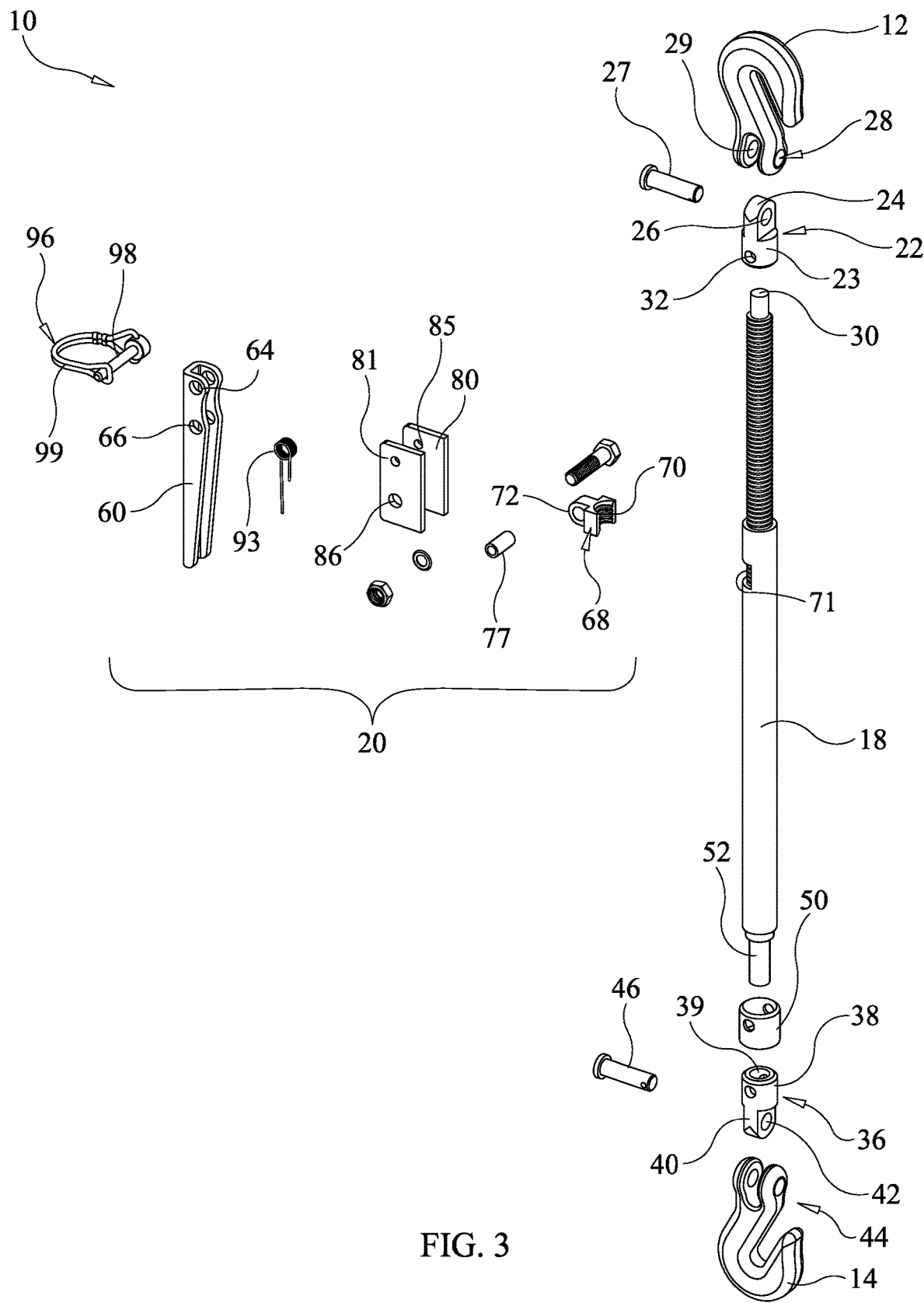
FIG. 3 is an exploded isometric assembly view of my new binder.

With joint initial reference now directed to FIG. 1-3, my new binder has been generally designated by the reference numeral 10. The elongated, variable length binder 10 comprises rigid, generic fastening means comprising chain hooks 12 and 14 pivoted to each end of the binder. The chain hooks may be fastened or coupled to a target such as a freight item, a tensioning chain, or a solid anchor point on a flatbed truck trailed.

The binder 10 comprises a rigid, elongated, threaded rod 16 that is coaxially received within a rigid, elongated sleeve 18. Rod 16 has external, preferably ACME threads, but of course other thread styles and sizes and pitches may be used. Binder length may be adjusted in use by axially and slidably displacing rod 16 relative to sleeve 18, or vice-versa. The non-mating opposite or remote ends of the rod 16 and sleeve 18 are connected to the chain hooks 12 and 14, or other fastening means. The smooth bore sleeve 18 is preferably unthreaded and thus readily permits sliding of the internally disposed rod 16. Thus axial displacements of rod 16 within sleeve 18 may lengthwise expand or contract the binder 10 as desired.

Figure 4:
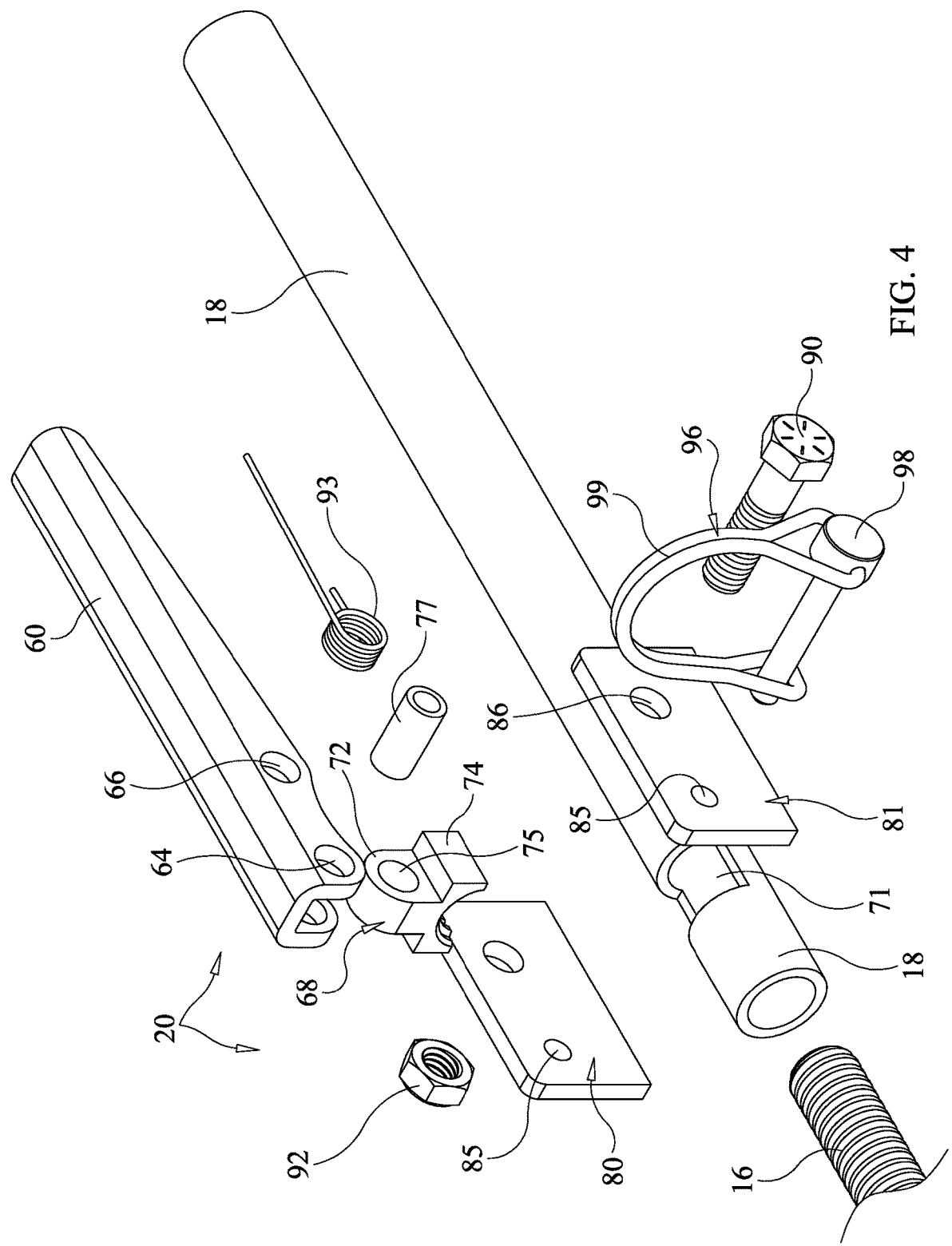
FIG. 4 is an enlarged, fragmentary, isometric exploded view of the lever construction; and, FIGS. 5-7 are enlarged, fragmentary, sectional views of the new binder sequentially showing it in locked, partially unlocked, and fully locked positions respectively.

Importantly, there is a lever-driven lock assembly 20 located approximately at the midpoint of the binder 10, preferably on sleeve 18, that is best seen in FIG. 4 and explained further below.

Referencing particularly FIG. 3, the chain hook 12 may be pivotally fastened to a coupling 22 having a lower tubular base 23 and an integral, upper tab 24 that has an aperture 26. The chain hook 12 comprises a clevis-like lower portion 28 that sandwiches tab 24 once inserted. In assembly, a pivot pin 27 penetrates aligned orifices such as passageways 26 and 29 to swivel chain hook 12 to the binder 10 (i.e., to rod 16 as in FIG. 2). The tubular base 23 of coupling 22 can be pinned to the reduced diameter, unthreaded end portion 30 (FIG. 3) of rod 16 with a pin 31 (FIG. 1) that penetrates a suitable orifice 32 (FIG. 3) in coupling base 23 to secure the coupling 22 to the unthreaded, reduced diameter end portion 30 of rod 16.

A chain hook 14 is also pivoted to the binder 10. Like chain hook 12, the chain hook 14 is fastened to a coupling 36 that is similar to a coupling 22. Coupling 36 has a tubular base 38 and an integral tab 40 that has an aperture 42. The chain hook 14 also comprises a clevis-like base 44, that sandwiches a tab 40 in assembly, being pivotally secured as before via a rigid pivot pin 46. In assembly, the tubular interior 39 of coupling base 38 is engaged by the reduced diameter stem portion 52 (FIGS. 1-3) of the sleeve 18 and secured by a concentric collar 50.

With primary reference now jointly directed to FIGS. 3 and 4, the lock assembly 20 preferably comprises an elongated, rigid lever 60 that has a pair of parallel, spaced apart sides having a first pair of aligned orifices 64 and a second pair of aligned orifices 66. Lever 60 deploys or retracts a thread locking mechanism preferably comprising an Acme half nut 68 for locking or unlocking the binder 10. The half nut 68 has an Acme threaded, arcuate portion 74 (FIG. 4) with interior threads 70 (FIG. 3) that, in operation, can engage exposed thread portions of the threaded rod 16. There is an access window 71 (i.e., FIG. 4) in the form of a cutaway defined in the sleeve 18 that exposes a relatively small portion of the threads of the internally disposed rod 16. Window 71 provides locking access of the half nut interior threads 70 to exposed threads of the rod 16 for locking.

With the critical half nut 68 positioned within the window 71, it is structurally braced against both longitudinal or lateral rocking movements that may be experienced during long distance, over-the-road travel on a heavy flatbed truck.

The half nut 68 also has an integral crown portion 72 including a bore 75 that, in assembly, is aligned with orifices 64 (FIG. 4) in the lever 60 and penetrated by a bushing 77 that enables limited pivoting. When the lever 60 is rocked, half nut 68 can be pivoted into or out of locking engagement with the rod 16. When pressed into contact with exposed threads on rod 16, the binder 10 will be secured.

In the best mode there are a pair of spaced apart, generally rectangular and parallel pin plates 80 and 81 (FIG. 4) welded to sleeve 18 on opposite sides of the window 71. These pin plates are provided with a first pair of aligned apertures 85 and a second pair of aligned apertures 86. Lever 60 is pivotally mounted to the binder 10 by a rigid fastener 90

(i.e., preferably a bolt) that penetrates pin plate orifices 86 and lever orifices 66 in assembly, being retained by hex nut 92 (FIG. 4). A spring 93 is captivated by fastener 90 and interiorly sandwiched between lever walls in assembly. Pin plates orifices 81 enable mounting of the conventional clevis retainer 96 whose mounting shaft 98 penetrates pin plate orifices 85 to pivotally and removably mount and secure clevis body portion 99.

Figure 7:
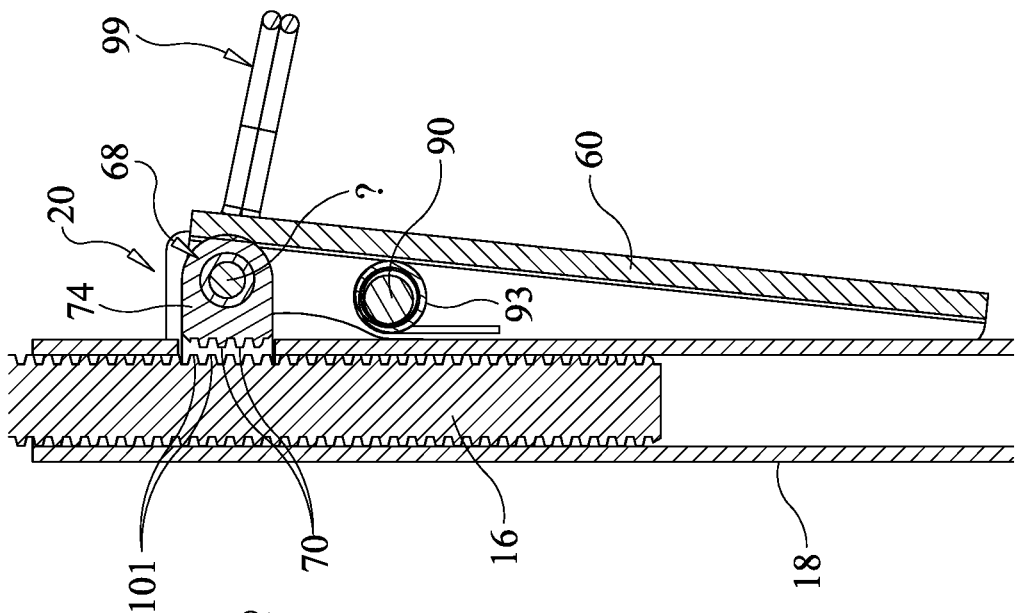
Figure 6:
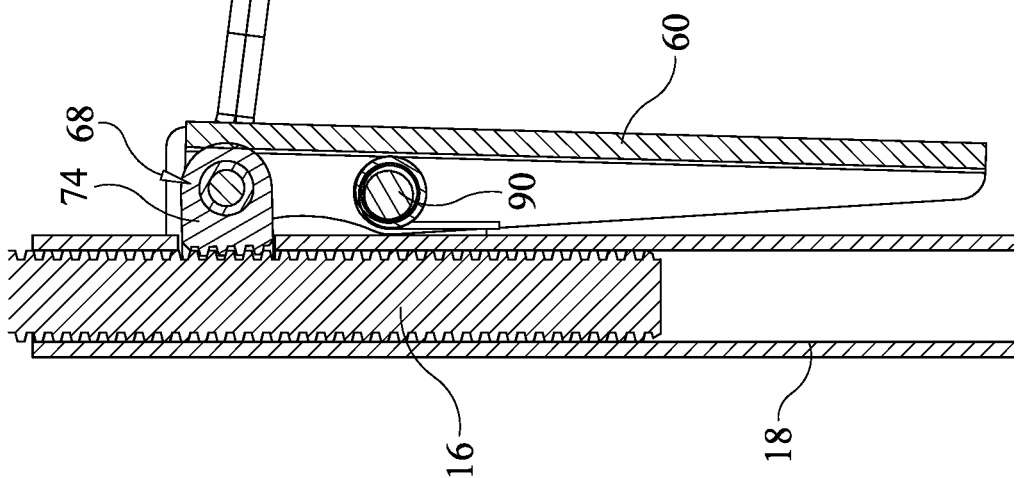
Figure 5:
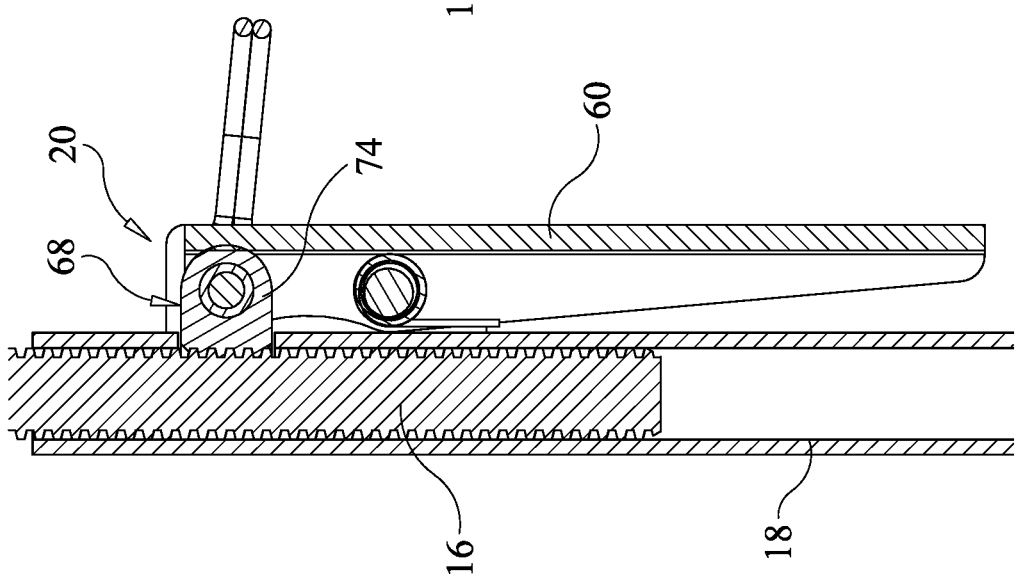

FIG. 5 shows the locked position. Here the half nut 68 has penetrated the window 71 (i.e., FIG. 3) and has engaged an exposed portion 101 (FIG. 7) of the rod threads. In FIG. 6 the half nut 68 is partially withdrawn, being about to assume a fully unlocked position. In FIG. 7 it is seen that the half nut 68, and more particularly the arcuate interior threads 70 thereof, have been disengaged from exposed rod threads 101 by depressing handle 60. When the handle 60 is released the spring 93 will return the half nut 68 of the lock assembly 20 into the engaged locking position.

From the foregoing, it is seen that this invention is one well adapted to obtain all the ends and objects herein set forth, together with other advantages inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rigid locking binder for securing miscellaneous loads and tie down chains, the binder comprising:
    a rigid, elongated and interiorly unthreaded sleeve, the sleeve comprising an interior;
    a rigid, elongated, rod that is externally threaded, the rod slidably coaxially disposed within said sleeve interior, whereby relative axial displacement between the rod and the sleeve lengthwise expands or contracts the binder;
    a first coupling having a tubular base and an integral, apertured tab projecting from said base;
    the rod comprising an externally exposed end pinned to said first coupling tubular base to prevent torsional displacements between the first coupling and the rod;
    a first chain hook comprising a clevis-like portion that is pivotally coupled to said apertured tab of said first coupling;
    a second coupling having a tubular base and second integral, apertured tab projecting from said base;
    the sleeve coupled to said second chain hook, the second chain hook comprising a clevis-like portion that is pivotally coupled to said apertured tab of said second coupling;
    the sleeve pinned to the tubular base of the second coupling to prevent torsional displacements between the sleeve and the second chain hook;
    a lock assembly for selectively axially locking the sleeve and rod together at a selected binder length, the lock assembly comprising:
        a pair of rigid, spaced-apart, generally parallel and elongated pin plates secured to the sleeve that are longitudinally parallel with the binder;
        an actuating lever that is pivotally mounted between and to said pin plates by a fastener extending between aligned orifices in said pin plates and said handle;
        an access window defined in said sleeve for exposing a portion of the threaded rod;
        a thread locking nut controlled by the lever for selectively engaging or disengaging exposed thread portions of the threaded rod through said access window in response to deflection of said lever, the locking nut comprising an integral crown portion comprising a through bore aligned with orifices in said lever and penetrated by a bushing that enables limited pivoting of the locking nut relative to the lever;
        a retainer for at least temporarily securing the lever in a selected operational position, the retainer comprising a portion traversing the pin plates; and a spring for biasing the lever into a locking position, said spring captivated by said locking nut bushing.

\* \* \* \* \*